Dec. 2, 1941.  R. W. STEVES  2,264,461
MACHINE FOR PACKAGING MERCHANDISE
Filed March 26, 1941  2 Sheets-Sheet 1
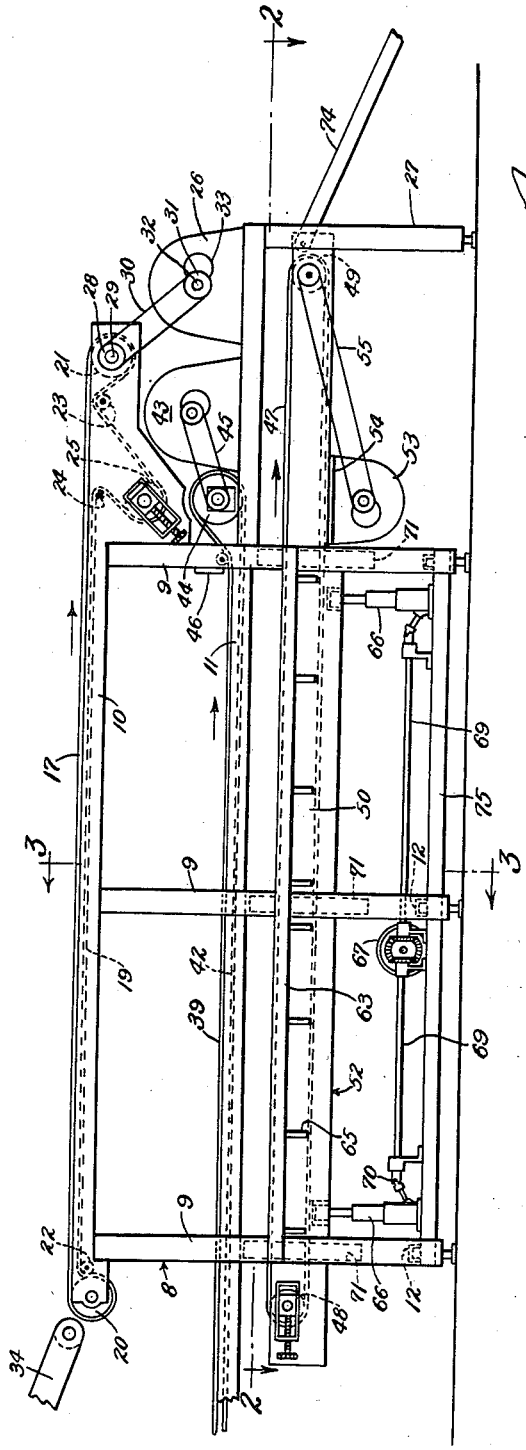
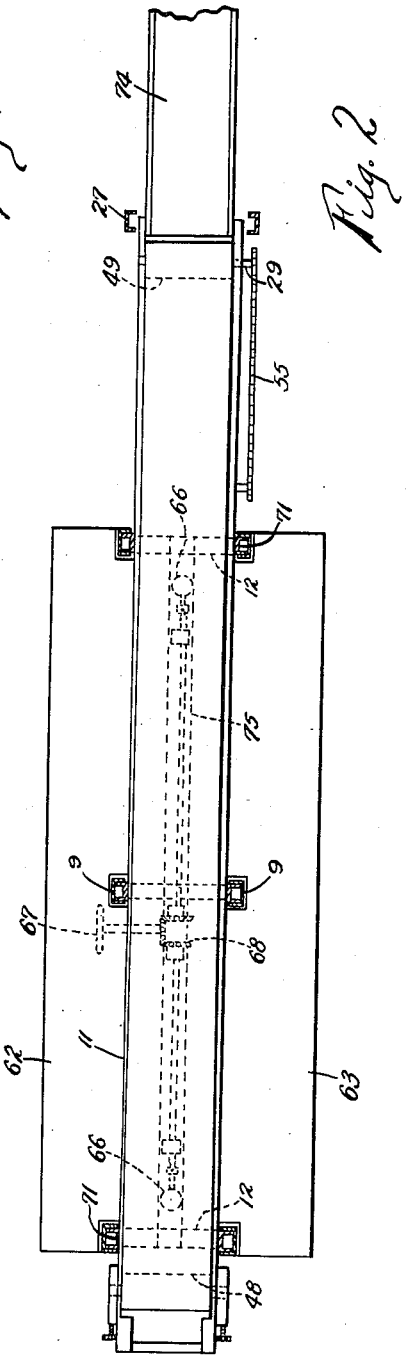
INVENTOR.
Richard W. Steves
BY Murray, Sackhoff & Paddack
ATT'YS

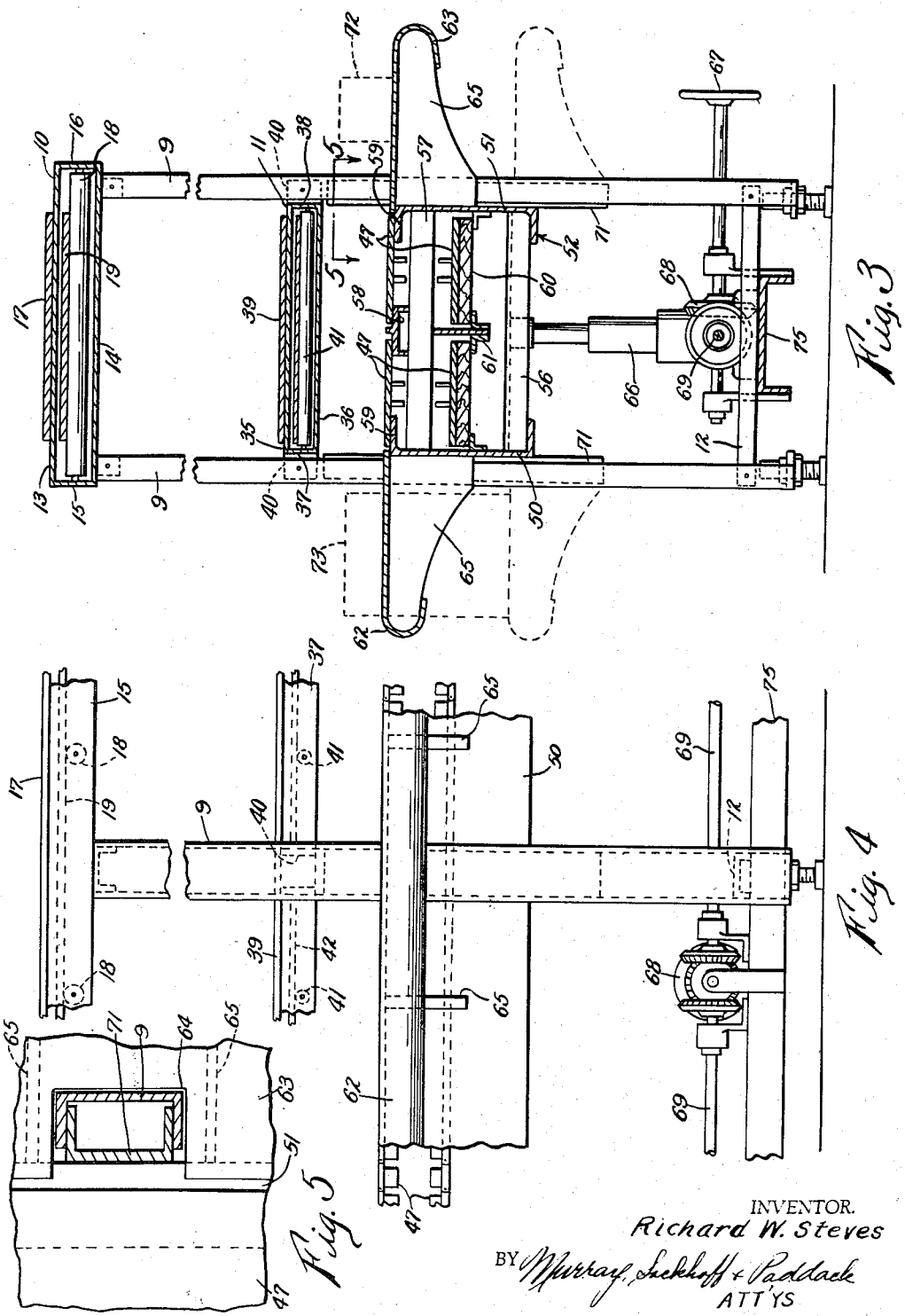

Patented Dec. 2, 1941

2,264,461

UNITED STATES PATENT OFFICE 2,264,461

MACHINE FOR PACKAGING MERCHANDISE

Richard W. Steves, Cincinnati, Ohio, assignor to Andrew Jergens Company, Cincinnati, Ohio, a corporation of Ohio Application March 26, 1941, Serial No. 385,331

5 Claims. (Cl. 198—19)

The present invention relates to improvements in packaging machines and is particularly directed to a machine for packaging bottled, or other merchandise, put up in containers.

Heretofore, in the packaging of articles by means of endless conveyors, the practice was to carry the articles on a conveyor to a packing station consisting of an elongated table for supporting packages, and at which a plurality of operators worked removing said articles from the conveyor and arranging them in said packages. The filled packages were then moved to a shipping station or platform on small trucks or on another conveyor belt. When a conveyor was used for moving the filled packages from the packing station to the shipping platform, it was generally positioned near the conveyor bearing the merchandise to said packing station, but the relative positions of the two conveyors and the packing table caused confusion and increased the work of the operatives working to transfer said merchandise from one belt to the other during the manual packaging operation. It is therefore an object of this invention to dispose the merchandise conveyor, package conveyor and work table in definite relative positions at the packing station, thereby increasing the efficiency of the operators and materially reducing labor fatigue due to unnecessary movements during the manual packing operations.

Another object of the invention is to provide a machine which has the least possible space between the levels of the merchandise conveyor and the work table consistent with efficient operation, thus reducing to a minimum the number of manual movements and the sustained time period of each movement made by an operative in packaging articles.

Another object of the invention is to provide a means whereby a package filled with merchandise may be easily transferred by the operative to the conveyor for moving it to the shipping station.

A still further object of the invention is to provide a machine possessing the above improved features which is compact and simplified so that it may be positioned in a relatively small area and which is adapted to greatly increase the efficiency of the operators using said machine.

Another object of the invention is to provide means whereby the vertical height of the package conveyor and the work table of a packaging machine may be varied relative to the merchandise conveyor therefor, thus keeping at a minimum the sustained time period of all manual movements made by operatives in filling packages on the machine regardless of the height of package to be filled, the vertical dimension of the articles to be packed, or the manner in which said articles are arranged in said package.

Other objects will be apparent from the following specification and drawings, in which:

Fig. 1 is a side elevational view of my packaging machine.

Fig. 2 is a cross-sectional view taken on line 2—2 of Fig. 1.

Fig. 3 is an enlarged cross-sectional view taken on line 3—3 of Fig. 1.

Fig. 4 is a fragmentary, side elevational view of the machine as it is illustrated in Fig. 3.

Fig. 5 is an enlarged cross-sectional view taken on line 5—5 of Fig. 3.

The embodiment of my invention consists of a frame 8 having vertical posts 9 for supporting an upper conveyor housing 10 and lower conveyor housing 11. The posts are preferably constructed of channel irons and are provided with vertically adjustable feet. The conveyor housings 10 and 11 and the cross members 12, disposed near the bottom of the posts cooperate with the posts to provide a rigid frame for the machine.

The upper conveyor housing (Fig. 3) has an elongated top 13, bottom 14, and side members 15 and 16, the top 13 serving as a slider bed for an endless belt 17 while in the sides 15 and 16 are journalled a number of spaced rollers 18 for taking up slack of the returning portion 19 of the endless belt 17. The endless belt 17 runs over end pulleys 20 and 21, snub rollers 22, 23 and 24, and around take-up roller 25 (Fig. 1) in a conventional manner. As shown in Figs. 1 and 2, the belt 17 is driven through pulley 21 by means of motor 26. The motor is connected to said pulley by means of a sprocket 28 fastened to the pulley shaft 29, said sprocket being driven by a chain 30 which engages a sprocket 31 fastened to a driven shaft 32. A variable speed drive 33 is interposed between the shaft 32 and motor 26 for varying the speed of the belt 17, as desired.

The belt 17 is accessible to operators of the machine and is adapted to move a number of empty cartons to be filled along the machine in the direction of the arrow, said cartons being introduced onto said belt by any means, such as an endless belt conveyor 34 (Fig. 1).

The conveyor housing 11 (Fig. 3) has a top 35, bottom 36, sides 37 and 38, the top 35 serving as a slider bed for a merchandise conveyor belt 39. The sides 37 and 38 are fastened by brackets 40 to the vertical posts 9 and also support a number of spaced pulleys 41 mounted transversely within said housing. The pulleys 41 support the return portion 42 of merchandise belt 39. As shown in Fig. 1, the merchandise conveyor is moved in the direction of the arrow by means of motor 43 which drives end pulley 44 around which the belt passes. The end pulley is driven by the motor 43 through sprocket and chain connection generally indicated at 45. Bottles, cans, or the like, containing merchandise are placed upon the belt 39 at a point removed from the lefthand side of Fig. 1, in a conventional manner, and are carried by said belt to positions between the vertical posts which are accessible to the operators of the machine, a stop 46 being positioned across the path of the articles on the belt so as to limit their motion in the direction of the arrow.

A package conveyor is positioned subjacent the merchandise conveyor and preferably consists of a pair of endless chains 47 which pass around end pulleys 48 and 49, said end pulleys being journalled in side rails 50 and 51 of a vertically movable carriage generally indicated as 52. The package conveyor is moved in the direction of the arrow (Fig. 1) by means of a motor 53 mounted on a cross member 54 fastened to the underside of the side rails 50 and 51, the motor being connected to the end pulley 49 by means of sprocket and chain indicated generally as 55. The side rails are held in spaced relationship by a number of longitudinally spaced cross-pieces 56 and 57 (Fig. 3). The upper cross-member 57 supports a centrally disposed longitudinal channel iron 58. The top surface of the channel iron 58 and flanges 59 extending from the top edges of the side rails 50 and 51 serve as a slider bed for the pair of chain conveyors 47. The return portions of the conveyor chains 47 are supported by wooden slider beds 60 which are supported at their inner ends by an extension 61 on the cross-members 57 and at their outer ends by the side rails 50 and 51 (Fig. 3).

Elongated packing tables 62 and 63 are supported by the carriage 52 and have their inner ends fastened to the upper edge of the side rails 50 and 51 and, as shown in Fig. 5, the top of said tables have cut-out portions 64 therein for clearing the vertical posts 9. A number of stiffening members 65 are fastened to the side rails and function to reinforce the tables 62 and 63.

The means for varying the vertical height of the carriage 52 relative to the merchandise conveyor 39 consists of two spaced jacks 66 which are actuated simultaneously by a hand wheel 67 through beveled gears 68, rods 69 and universal joints 70. The jacks and their actuating mechanism are mounted on a centrally disposed channel iron 75 which is fastened to cross-members 12 of the frame. The carriage is guided in the frame by channel irons 71 which freely move in the posts 9 and which are fastened to the side rails 50 and 51 (Fig. 5). As shown in dotted lines in Fig. 3, the tables 62 and 63 and the package conveyors 47 may be varied relative to the merchandise conveyor 39 so that a small package 72 or a large package 73 may be accommodated by the machine and filled by operators therefor with a minimum of manual labor. The filled packages are moved in the direction of the arrow on conveyors 47 and move from thence down gravity conveyor section 74 to the shipping station or platform (not shown).

The operation of the packing machine just described is as follows: Before the machine is used, the relative distance between the package conveyors 47 and the merchandise conveyor 39 is determined by the vertical height of the package to be filled from articles moving along on the merchandise conveyor 39. The distance between the conveyors should be slightly greater than the vertical height of the package. The jacks 66 are then operated to move the package conveyor to the proper position relative to the merchandise conveyor. The endless belts 17 and 39 and endless chain 47 are then moved in the direction of the arrows (Fig. 1) by means of their respective motors and drive connections. A plurality of operators are stationed at the tables 62 and 63 in a position to reach articles on the belt 39 and packages resting upon said tables. Empty cartons or packages to be filled are then introduced to the left side of the moving endless belt 17 from conveyor 34 while articles of bottled merchandise are placed on the merchandise conveyor 39 at some point remote from the lefthand side of said machine. The operators then reach up to obtain empty packages to be filled and place them upon the tables with their upper ends opened and proceed to fill said packages from the merchandise moving past them on the belt 39. As the packages are filled, the operators push said packages onto package conveyor chains 47 and said conveyor moves said cartons onto gravity conveyor section 74 and thence to the shipping station.

What is claimed is:

1. In a machine for packaging merchandise the combination of an elongated frame having vertical side posts, a merchandise conveyor fixedly mounted longitudinally on the frame between the side posts and adapted to move articles thereon to positions accessible to a plurality of operators, a longitudinally extending carriage member movably mounted on the frame subjacent the merchandise conveyor and spaced therefrom a distance slightly greater than the vertical height of a package, said member comprising spaced side rails, cross-members connecting said rails, guides fixed to the rails and vertically movable in the posts, a package conveyor slidably supported by the upper portions of the side rails, means for varying the vertical position of the carriage relative to the merchandise conveyor, and an elongated packing table positioned on each side rail flush with the package conveyor and extending beyond the posts to a position available to said operators, the inner edge of the tables being contiguous to the adjacent edge of said package conveyor.

2. In a machine for packaging merchandise the combination of an elongated frame having vertical side posts, a longitudinally extending carriage member movably mounted on the frame between the posts and comprising spaced side rails, cross-members connecting said rails, guides fixed to the rails and vertically movable in the posts, means for elevating and lowering the carriage member, an elongated operators' table positioned on each side rail and extending outside the posts, a merchandise conveyor fixedly mounted longitudinally on the frame above the carriage member and spaced therefrom a distance slightly greater than the vertical height of a package, and a package conveyor slidably supported upon the side rails and disposed on a level with the tables, the inner edge of the tables being contiguous to the adjacent edge of the package conveyor.

3. In a machine for packaging merchandise the combination of a frame, a merchandise conveyor fixed on the frame for moving articles to a position accessible to an operator, a carriage member movably mounted on the frame subjacent the merchandise conveyor, means for varying the vertical position of the carriage member relative to said conveyor, a package conveyor upon the carriage member, and a packing table positioned on said carriage member contiguous to the package conveyor and in a position available to the operator, the top of said table being flush with the receiving surface of the package conveyor.

4. In a machine for packaging merchandise the combination of a frame, a merchandise conveyor mounted on the frame for moving articles to a position accessible to an operator, a carriage member movably mounted on the frame subjacent the merchandise conveyor, means for varying the vertical position of the carriage member relative to said conveyor, a package conveyor on the carriage member, and a packing table positioned on said carriage member contiguous to the package conveyor and in a position available to the operator.

5. In a machine for packaging merchandise the combination of a merchandise conveyor for moving articles to a position accessible to an operator, a carriage member disposed subjacent the merchandise conveyor, means for varying the vertical position of the carriage member relative to said conveyor, a package conveyor on the carriage member, and a packing table positioned on said carriage member contiguous to the package conveyor and in a position available to the operator.

RICHARD W. STEVES.